May 26, 1970  D. N. MASHBURN  3,514,613

SYSTEM PROVIDING STABLE PULSE DISPLAY FOR SOLUTION ANALYZER

Filed Dec. 18, 1968

INVENTOR.
Douglas N. Mashburn
BY
ATTORNEY.

United States Patent Office 3,514,613
Patented May 26, 1970

---

3,514,613
SYSTEM PROVIDING STABLE PULSE DISPLAY FOR SOLUTION ANALYZER
Douglas N. Mashburn, Clinton, Tenn., assignor to the United States of America as represented by the United States Atomic Energy Commission
Filed Dec. 18, 1968, Ser. No. 784,719
Int. Cl. H04n *3/12;* G01n *21/26*
U.S. Cl. 250—218                              4 Claims

---

ABSTRACT OF THE DISCLOSURE

In a photometric solution analyzer including an oscilloscope display device for the simultaneous determination of the concentration of a common substance in a plurality of discrete samples, an electronic system is provided for automatically matching the horizontal sweep time of the oscilloscope to the time required for each revolution of a centrifuge rotor of the analyzer, the rotor containing a plurality of the samples being analyzed, thus providing a stable display despite the fact that the generation-times for the trains of pulses from the analyzer are short and variable.

---

BACKGROUND OF THE INVENTION

The present invention was made in the course of, or under, a contract with the United States Atomic Energy Commission.

In prior art instruments of the class by which a large number of samples containing a common substance or activity are analyzed, most of such instruments are capable of performing analyses only in sequence, rather than simultaneously. Not only does this characteristic limit the analytical production, but in the case of analyzing very small samples, the analytical results are usually unreliable.

If a series of reactions done in parallel is carried to completion, it is not important that they all be started at exactly the same time. However, many colorimetric reactions are time dependent and the color density increases slowly, may then plateau, and may subsequently decrease. In such instances, and where reaction rates are measured, as in the case with enzymatic reactions, it would be of advantage to have all of a set of reactions started at as nearly the same time as possible, provided that all optical measurements could also be carried out accurately over a short time span.

Thus, there exists a need for an analyzer system in which a plurality of samples can be analyzed in a relatively short time and in which the results therefrom can be displayed simultaneously within a short time span. The present invention was conceived to meet this need in a manner to be described below.

SUMMARY OF THE INVENTION

It is the object of the present invention to provide a system in which a plurality of samples can be analyzed simultaneously in a relatively short time and in which the results therefrom can be displayed simultaneously in a stable manner within a short time span.

The above object has been accomplished in the present invention by providing a power-driven centrifuge rotor containing a plurality of sample receiving chambers positioned at the periphery of the rotor, each of the chambers containing a sample to be analyzed and provided with axially aligned windows such that light from a light source is sequentially directed through each of the chambers onto a photo-detecting unit as the chambers sequentially pass therebetween to provide a plurality of output signals from the unit as a function of the light absorbency effected by the sample in each of the chambers. The output of the photodetecting unit is connected to the vertical input of an oscilloscope, while the horizontal input to the oscilloscope is connected to means associated with the rotor for automatically matching the horizontal sweep time of the oscilloscope to the time required for each revolution of the rotor in a manner to be described below, such that a stable display is provided despite the fact that the generation-times for the trains of pulses from the photodetecting unit are short and variable.

DESCRIPTION OF THE PREFERRED EMBODIMENT

Figure 1:
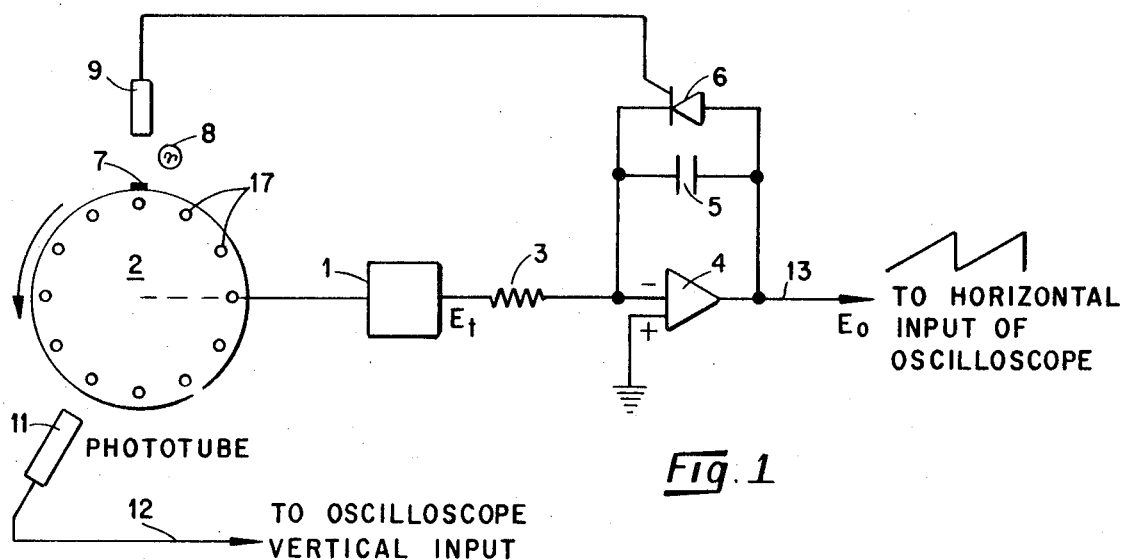
FIG. 1 is a schematic diagram of one embodiment of the present invention.

In FIG. 1, the centrifuge-type rotor 2 is power-driven by means, not shown, in a conventional manner. Disposed within the rotor 2 are a plurality of sample containing cuvette chambers, one below each of the light-path defining holes 17 as more clearly illustrated in FIG. 2 which shows a typical cuvette chamber 19. As further shown in FIG. 1, a voltage-generating tachometer 1 is mechanically coupled to the rotor 2 to generate a negative output voltage, $E_t$. This voltage, which is directly proportional to the speed of the rotor, is fed through a resistor 3 to an input terminal of an operational amplifier 4. The amplifier 4 may be a Philbrick Model EP–85AU, for example. The positive terminal of the amplifier is grounded, as shown. Connected between the negative terminal of the amplifier 4 and its output terminal is a capacitor 5. A silicon-controlled rectifier (SCR) 6 is connected across the capacitor 5. The silicon-controlled rectifier 6, which acts as a gate, is connected to receive the output from a synchronizing circuit which includes a lamp 8 and a photodiode 9 which receives light from the lamp 8 by means of a light-reflecting spot 7 on the rotor 2.

Because of the high gain of the amplifier 4, the input voltage at its negative terminal is maintained very close to zero. Thus, the input current ($i$) is equal to $E_t$/resistance 3 and is proportional to $E_t$. Neglecting the small current drawn by the amplifier 4, the voltage developed on capacitor 5 is equal to a value which is equivalent to the amplifier output voltage, $E_o$, since the negative input terminal is essentially at zero. Thus, $E_o$ increases linearly with time at a rate determined by the speed of the rotor 2. As indicated, the amplifier output voltage is connected to the horizontal input to an oscilloscope. The vertical input to the oscilloscope is connected to the output of a photodetecting unit 11 whose analytical function will be described below.

Once during each revolution, the reflecting spot 7 on the rotor 2 comes into a position where it reflects light from the lamp 8 onto the photodiode 9. The photodiode 9 then generates a short-lived pulse which turns on the SCR gate 6, discharging the capacitor 5 and reducing the sweep voltage $E_o$ from the output of amplifier 4 to zero in preparation for the next revolution of the rotor 2. Thus, there is provided means for automatically matching the horizontal sweep time of the oscilloscope to the time required for each revolution of the rotor. In other words, the above described system resets the oscilloscope horizontal sweep each time the rotor completes one revolution.

Figure 2:
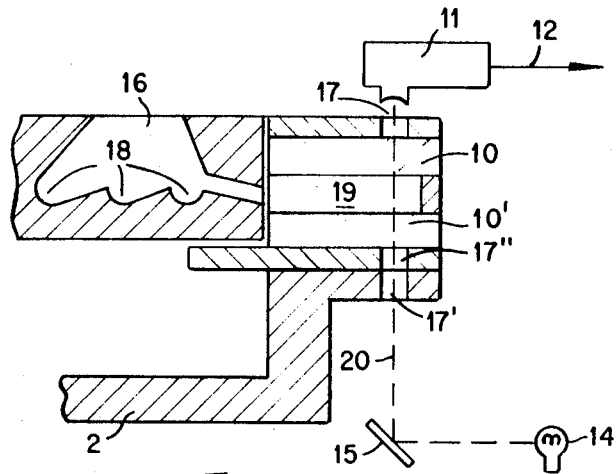
FIG. 2 is a partial showing of the centrifuge rotor of FIG. 1 together with the light and photodetecting unit associated therewith.

The means for analyzing the contents in each of the sample containing cuvette chambers of the rotor 2 is illustrated in FIG. 2. As mentioned above, there is a cuvette sample chamber 19 disposed below each of the light-path defining holes 17 in the rotor 2 of FIG. 1. Each of the chambers 19 is defined by a pair of glass windows 10, 10', and each chamber is in communication with a chamber 16 which is open at its top to receive one or more sample solutions in each of the cup-like depressions 18 within the chamber 16. The depressions 18 are disposed generally in radial alignment with the analyzing chamber 19, and are shaped and sized to retain sample liquids by gravitational and surface tensional forces when the rotor 2 is at rest, but to permit the release and centrifugal transfer of liquid to the chamber 19 when the rotor is spinning.

Light from a source 14 is directed by means of a mirror 15 as a beam 20 through lower light-path defining holes 17' and 17" in the rotor housing, then through the glass window 10', the sample chamber 19, the glass window 10, and the upper light-path defining hole 17 onto the photo-detecting unit 11. The output of the unit 11 is connected by means of a lead 12 to the vertical input to the oscilloscope as mentioned above. Thus, as the rotor 2 is rotated between the light source and the detecting unit 11, there will be provided a plurality of output signals from the unit 11, each of such signals being a function of the light absorbancy of each respective sample disposed in each respective sample containing chamber 19.

It should be understood that the number of sample receiving chambers 19 and their associated holes 17 is not limited to 12, as shown in FIG. 1, but may be of any desired or required number up to at least 100. Only 12 holes 17 are shown in FIG. 1 for the sake of clarity.

The above described means for automatically matching the horizontal sweep time of the oscilloscope to the time required for each revolution of the sample containing rotor insures that a stable display will be provided by the oscilloscope despite the fact that the generation-times for the trains of pulses from the detecting unit 11 are short and variable.

Figure 3:
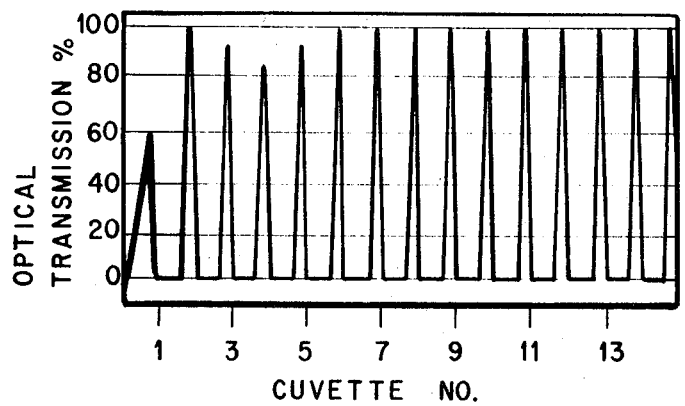
FIG. 3 is an oscillogram obtained with the system of FIG. 1, which is a typical display for one rotor revolution.

The system of FIGS. 1 and 2, as described above, has operated satisfactorily in tests conducted with a rotor carrying fifteen cuvette chambers containing various solutions. The oscilloscope display, as shown in FIG. 3, remained stable for speeds of the rotor over the range of interest, that is, 60 to 2900 r.p.m. FIG. 3 is a typical display for one rotor revolution. Cuvettes 1, 3, 4, and 5 contain a light-absorbing dye for purposes of illustration.

It should be noted that the complete structural details of the rotor 2 and the method of feeding liquid samples thereto is the subject matter of Ser. No. 784,739, filed Nov. 18, 1964, and having a common assignee with the present application.

It should be understood that the above described system is not limited for use with a photometric solution analyzer. For example, the system can be used in a system for measuring the blade-clearance-versus-rotor-angular-position characteristic of operating diffusion plant compressors.

This invention has been described by way of illustration rather than by limitation and it should be apparent that the described system is equally applicable in fields other than those described.

What is claimed is:
1. In a device for the simultaneous determination of the light transmission through a plurality of sample spaces positioned at spaced intervals along the periphery of a power-driven rotor, photometric detecting means associated with said rotor for sensing the amount of light passing through each of said spaces during rotation of said rotor to sequentially provide a plurality of output signals as a function of the respective light transmission through each of said spaces, and an oscilloscope connected to said photometric detecting means to provide a visual indication of the respective pulse heights of said output signals, the improvement comprising an electronic system for automatically matching the horizontal sweep time of said oscilloscope to the time required for each revolution of said rotor, said system including a voltage-generating tachometer mechanically coupled to said rotor for generating a negative output voltage, a series connected resistor and operational amplifier connected to said tachometer output voltage, means for connecting the output of said amplifier to the horizontal sweep input to said oscilloscope, means for connecting the output of said photometric detecting means to the vertical input to said oscilloscope, a gate circuit connected to said amplifier, and means associated with said rotor for supplying a gating pulse to said gate circuit once during each revolution of said rotor, said gate circuit thus effecting the reduction of the output voltage from said amplifier to zero once during each revolution of said rotor, whereby the oscilloscope sweep voltage is reset each time said rotor completes one revolution.

2. The device set forth in claim 1, wherein said device is a photometric solution analyzer, said sample spaces are a plurality of curvette chambers with axially aligned windows positioned at said rotor periphery, said rotor being a centrifuge rotor, each of said chambers adapted to receive a respective sample to be analyzed, said photometric detecting means sensing the light absorbancy effected by the sample in each of said chambers to sequentially provide said plurality of output signals as a function of the respective light absorbancy of each of said samples.

3. The analyzer set forth in claim 2, wherein a capacitor is connected across the input and output of said amplifier, and said gate circuit includes a silicon controlled rectifier gate connected across said capacitor, said gating pulse being supplied to said silicon controlled rectifier gate once during each said revolution of said rotor.

4. The analyzer set forth in claim 3, wherein said means associated with said rotor for supplying said gating pulse to said gate circuit includes a photodiode, a lamp, and a light reflecting spot on said rotor for directing light from said lamp onto said photodiode to provide said gating pulse therefrom once during each revolution of said spot on said rotor.

References Cited

UNITED STATES PATENTS

| | | | |
|---|---|---|---|
| 2,361,447 | 10/1944 | Baker | 356—203 |
| 2,552,107 | 5/1951 | Miller et al. | 250—218 X |
| 3,264,481 | 8/1966 | Hoegerl | 250—236 X |
| 3,372,230 | 5/1968 | Wurz | 178—7.6 X |

WALTER STOLWEIN, Primary Examiner

U.S. Cl. X.R.

250—223; 178—7.6; 356—180